United States Patent
Slotte et al.

(10) Patent No.: US 6,408,063 B1
(45) Date of Patent: Jun. 18, 2002

(54) METHOD AND ARRANGEMENT FOR COMPLEMENTING A TELEPHONE CONNECTION WITH ADDITIONAL INFORMATION

(75) Inventors: Sverre Slotte, Esbo; Arto Karppanen, Helsinki, both of (FI)

(73) Assignee: Nokia Mobile Phones Ltd., Espoo (FI)

(*) Notice: Subject to any disclaimer, the term of this patent is extended or adjusted under 35 U.S.C. 154(b) by 0 days.

(21) Appl. No.: 09/412,926

(22) Filed: Oct. 5, 1999

(30) Foreign Application Priority Data

Oct. 6, 1998 (FI) .................................................. 982159

(51) Int. Cl.[7] .............................. H04M 7/00; H04J 1/14; H04J 3/12
(52) U.S. Cl. ........................................ 379/230; 370/522
(58) Field of Search ....................... 379/142.01, 142.04, 379/201.01, 207.02, 207.11, 207.14, 207.15, 229, 230, 234, 235, 236, 237; 370/522

(56) References Cited

U.S. PATENT DOCUMENTS

| | | | |
|---|---|---|---|
| 5,289,472 A | * | 2/1994 | Cho ............................ 370/467 |
| 5,504,893 A | * | 4/1996 | Kawashima et al. ........... 707/9 |
| 5,542,072 A | * | 7/1996 | Kawashima et al. .......... 707/10 |
| 5,583,658 A | * | 12/1996 | Takezawa et al. ........... 358/440 |
| 5,809,127 A | | 9/1998 | Ostreil ..................... 379/201.5 |
| 5,818,921 A | * | 10/1998 | Vander Meiden et al. .. 379/225 |

FOREIGN PATENT DOCUMENTS

| | | | |
|---|---|---|---|
| EP | 0515273 A3 | 11/1992 | |
| EP | 0555014 A3 | 8/1993 | |
| EP | 0796020 A2 | 9/1997 | |
| EP | 0856973 A2 | 5/1998 | |
| EP | 0924917 A2 | 6/1999 | |
| EP | 0924 917 A2 | 6/1999 | ............ H04M/3/42 |
| WO | WO 99/25107 | 5/1999 | |

OTHER PUBLICATIONS

GSM Technical Specification 02.87, Nov. 1997, Version 5.2.1, Digital Cellular Telecommunications System (Phase 2+); User–to–User Signalling (UUS); Service description, Stage 1.

Finnish Search Report.

* cited by examiner

Primary Examiner—Harry S. Hong
(74) Attorney, Agent, or Firm—Perman & Green, LLP (57) ABSTRACT

For complementing a telephone connection with additional information a first telecommunication device transmits to a second telecommunication device a request for setting up a telephone connection (102, 302, 402). In association with said request, a first signalling message (103, 303, 403) is transmitted. The receiver of the first signalling message (104, 304, 404) makes a decision about how to handle the call on the basis of the information received in said first signalling message (105, 305, 405).

9 Claims, 5 Drawing Sheets

METHOD AND ARRANGEMENT FOR COMPLEMENTING A TELEPHONE CONNECTION WITH ADDITIONAL INFORMATION

TECHNOLOGICAL FIELD

The invention generally concerns the communication of additional information in close association with a telephone connection. Especially the invention concerns the use of such communicated information for providing added value to the telephone connection.

BACKGROUND OF THE INVENTION

In many cases there exists a need for transmitting, in close association with a telephone connection, other information than the simple request for call connection and the subsequent voice and/or data transfer. The additional information may be for example in the form of relatively short character strings, where "relatively short" means strings containing usually some tens of characters, or some hundreds at most. Other types of additional information comprise (but are not limited to) binary messages and short executable instructions transmitted between digital computer devices.

In a very simple example it has been found useful to inform the intended recipient of a telephone call about the identity of the caller. A known solution for this task is to communicate, in digital telephone systems, the Calling subscriber Line Identity or CLI number of the caller's telephone to the intended recipient's telephone as a part of the message that indicates the incoming request for call establishment. Known ways for utilizing the received CLI number at the receiving end are displaying it to the user, converting it to a name or other alphanumeric identifier fetched from a memory and displaying the conversion result to the user, comparing the CLI number to a list of preprogrammed identification rules and selectively refusing or accepting the call depending on the comparison result, or selecting a preprogrammed ringing tone according to who is calling.

The drawbacks of the CLI application relate to the fixed relationship between the CLI and a certain mobile station (in mobile telephone systems) or telephone plug socket (in fixed telephone systems). The CLI number has no direct relationship to he actual caller; it only identifies the hardware he is using. In many mobile telephone systems the CLI is stored in a removable SIM or Subscriber Identity Module that was originally meant to be strictly personal, but in practice the "authorised" or documented user of such a mobile telephone+SIM combination always lets other people use the telephone without requiring them to use their own SIM. Another drawback is that the CLI number is seldom informative enough to add a significant amount of value to the call.

A known way of communicating relatively short character strings without an association to a telephone connection is the use of Short Message Services or SMS. Certain digital telephone systems like the GSM (Global System for Mobile telecommunications) allow the users to transmit and receive SMS messages that traverse the network in the form of signalling and do not require the establishment of a call connection. The transmitting user may compose each SMS message freely within the available character set, so they are very well suited for customised communication. However, it is just their independency of call connections that makes SMS messages slightly unpractical for transmitting strictly call-related information. Irrespective of whether a user is placing a call or not, he must initiate the SMS mode separately. Additionally the system will usually give no guarantees about the delay it takes before a transmitted SMS message reaches its destination.

From the technology of Private Automated Branch Exchanges or PABXs and from numerous other applications there is known the transfer of numerical character strings in the form of Dual Tone Multifrequency (DTMF) sequences. A user may transmit a number or a string of numbers by manually pressing the corresponding numerical keys in a telephone, which transmits the standardised characteristic dual audio tone combination on each keystroke. The receiving PABX or other device interprets the numerical sequence and uses the interpreted information in taking some further action. In a typical application the PABX belongs to an insurance company or other enterprise with a very large computerised customer database, whereby the calling customer gives his customer identification number as a DTMF sequence and the PABX searches and displays the customer's file on the screen of the person who is going to answer the call. This method is limited to the transmission of numerical information and requires a DTMF encoder in the transmitting device and a correponding DTMF decoder at the receiving end. Additionally it necessitates always the full establishment of a telephone connection before the transmission of numerical strings becomes possible.

SUMMARY OF THE INVENTION

It is an object of the present invention to provide a method and an arrangement for the transmission of call-related information, avoiding the above-described drawbacks of the prior art solutions. It is a further object of the invention to present a method and an arrangement for using the transmitted information for providing added value to the users taking part in the telephone connection.

The objects of the invention are achieved by using user-to-user signalling for transmitting call-related information, and by defining certain practices for handling the user-to-user signalling messages.

The method according to the invention is characterised in that it comprises the steps of transmitting from a first telecommunication device to a second telecommunication device a request for setting up a telephone connection, transmitting, from one of said first and second telecommunication device to the other, a first signalling message associated to the call the setting up of which was requested by said request, and making a decision about how to handle the call the setting up of which was requested by said request, on the basis of the information received in said first signalling message.

The invention also applies to a telecommunication device comprising a memory, a processing unit, a transmitting unit and input means. It is characteristic to the device according to the invention that as a response to a command given by a user through the input means, said command indicating the user's wish to place a call to a certain telephone number, the processing unit is arranged to transmit to said telephone number a request for setting up a telephone connection, read previously stored information from said memory, and transmit to said telephone number, through the transmitting unit and in association with said request for setting up a telephone connection, a first signalling message carrying the information read from said memory.

User-to-User signalling or UUS is a procedure recently disclosed as a supplementary service in some advanced telephone systems. Its inteded use is the transmission of a limited amount of subscriber generated information (UUI; User-to-User Information) to and/or from another user in association with a call between the users concerned. The nature of UUS dictates that the network that mediates the communication between the users does not interpret the UUI or act upon it in any way, i.e. it is passed "transparently" through the network. This patent application will refer to the known aspects of UUS in the form in which they have been disclosed in the document "GSM 02.87: GSM Digital Cellular Telecommunications System (Phase 2+); User-to-User Signalling (UUS); Service Description, Stage 1, v.5.2.1", which has been published by ETSI (European Telecommunications Standards Institute) in November 1997.

According to the invention, UUS is used to convey certain caller- and/or receiver-related information between the calling party and the called party in the beginning of a call, during a call and/or at the end of a call. The transmitted information is used in the other end to manually and/or automatically evaluate some features that are helpful in deciding how to handle the call.

In a first embodiment of the invention the calling party (known as "A" in the common telephone jargon) transmits manually and/or automatically some additional information about him/herself to the called party ("B") at the call setup phase or during the call. In this context, "additional" means such information that does not form a part of a routine call setup request like the CLI number. At the receiving end B may use this information for directing A's call to a certain person or certain extension or for identifying and retrieving previously stored data from a database. The invention does not set any limits to the nature and content of the information transmitted by A. It may be a routine message transmitted at the setup of each new call, or the transmitted information may be selected according to the identity of the called party.

In an advanced variation of the first embodiment of the invention A is a remote user of a restricted data system (B) and the information transmitted at the call setup phase contains a password or other classified identifier that the data system uses to check A's authorisation for using the system. A positive identification causes B to place a call back call to A for the establishment of a data transfer connection, and in negative cases B simply rejects the attempted call.

The invention does not limit the direction into which information is transferred by using the UUS. In a second embodiment of the invention A is a remote operator responsible for the operation of a computerised system or device. Operation begins with a data call from A to B. B answers either by a call rejection together with a short UUS message indicating the cause of the rejection, or by accepting the call if there is enough data to be transferred to A to justify a data call being set up.

A further embodiment of the invention is applicable in a situation where B is not able to answer A's call for the moment, but wants to inform A about the reason for him not answering. According to the invention B transmits manually or automatically a UUS message to A informing him about the situation. The selection of the UUS message to be sent may be based on the identification of the calling party.

BRIEF DESCRIPTION OF DRAWINGS

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 1:
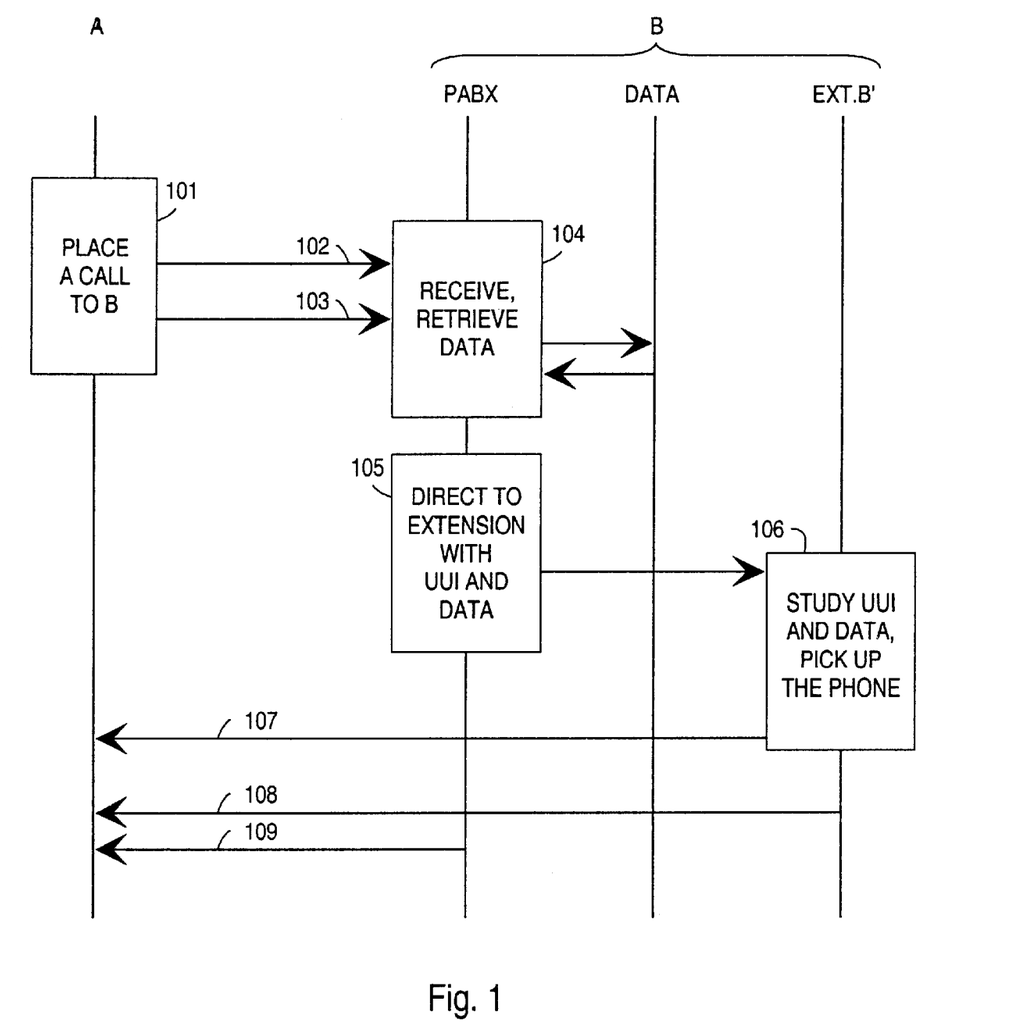
FIG. 1 illustrates a first advantageous embodiment of the invention.

FIG. 1 illustrates a first advantageous embodiment of the present invention. Here A is a client of a large international company B, which uses a PABX with numerous extensions (of which only one is shown) and a computerised client database DATA. B could also be a public library, a hospital or health center, a governmental office or any other institution that receives a large number of calls from different persons daily. At stage 101, A places a call to B wishing to discuss some matters relating to his businesses with B. Arrow 102 represents the call setup request or other corresponding message or group of messages that traverses the telecommunications network mediating the connection between A and B. Together with the call setup request 102 or immediately thereafter, A's telephone (or other communications terminal that A is using) transmits a UUS message 103 containing some information that characterises A. Typical examples of such information are A's name, the customer identification number that B uses to locate A's files, and a language code indicating the language that A wishes to use in telephone conversations. The UUS message 103 traverses the network and reaches the PABX of B exactly or nearly simultaneously with the call setup request 102.

Stage 104 represents a series of operations in the PABX of B, comprising among others the receiving of the call setup request 102 and the UUS message 103. The PABX examines the UUS message 103 to find out who the caller is, whether there is a previously stored customer file with a customer identification number matching that received in the UUS message and whether the UUS message gives any hint of what kind of service the caller might request. An example of the latter is the indication of language. As a result the PABX connects the call setup request further to extension B', where there should be a person speaking the requested language, at stage 105. Simultaneously the PABX retrieves the identified customer file from database DATA and displays it on the screen of the person at extension B' along with the caller's name, language request and possible other information received in the UUS message. FIG. 1 shows the information retrieved from DATA as going through the PABX; this is not necessary if the PABX can give the database and the computer of B' suitable instructions for realising the necessary data transfer operations between themselves and without routing the data through the PABX. Methods for realising the information retrieval, transfer and displaying are known as such from prior art, as mentioned previously. All information from the UUS message need not be forwarded to B'. After having studied the forwarded UUI and data the person at extension B' answers the call by picking up the phone at stage 106. Arrow 107 represents the message or the group of messages that traverse the network as an indication that the person at extension B' has answered the call setup request, whereafter the call may proceed normally.

If the telephone of B' or the PABX of B is capable of transmitting UUS messages, one of them or even both of them may transmit a reply UUS message 108 or 109 to A to inform A about some details concerning the service provided. For example, A might receive the name and/or direct number of the person at extension B' so that he can direct any possible later calls to B to the same person. If A is a new client without a previously issued customer identification number, the PABX or the database DATA might generate one in association with the proceedings discussed above and send it to A as UUI. The "reply" message may be sent even as the first UUS transaction relating to the call, meaning that regardless of whether or not A has originally transmitted anything in UUS form, he may receive the name and/or direct number of the person at extension B', or some other information relating to the call, as UUI.

Figure 2:
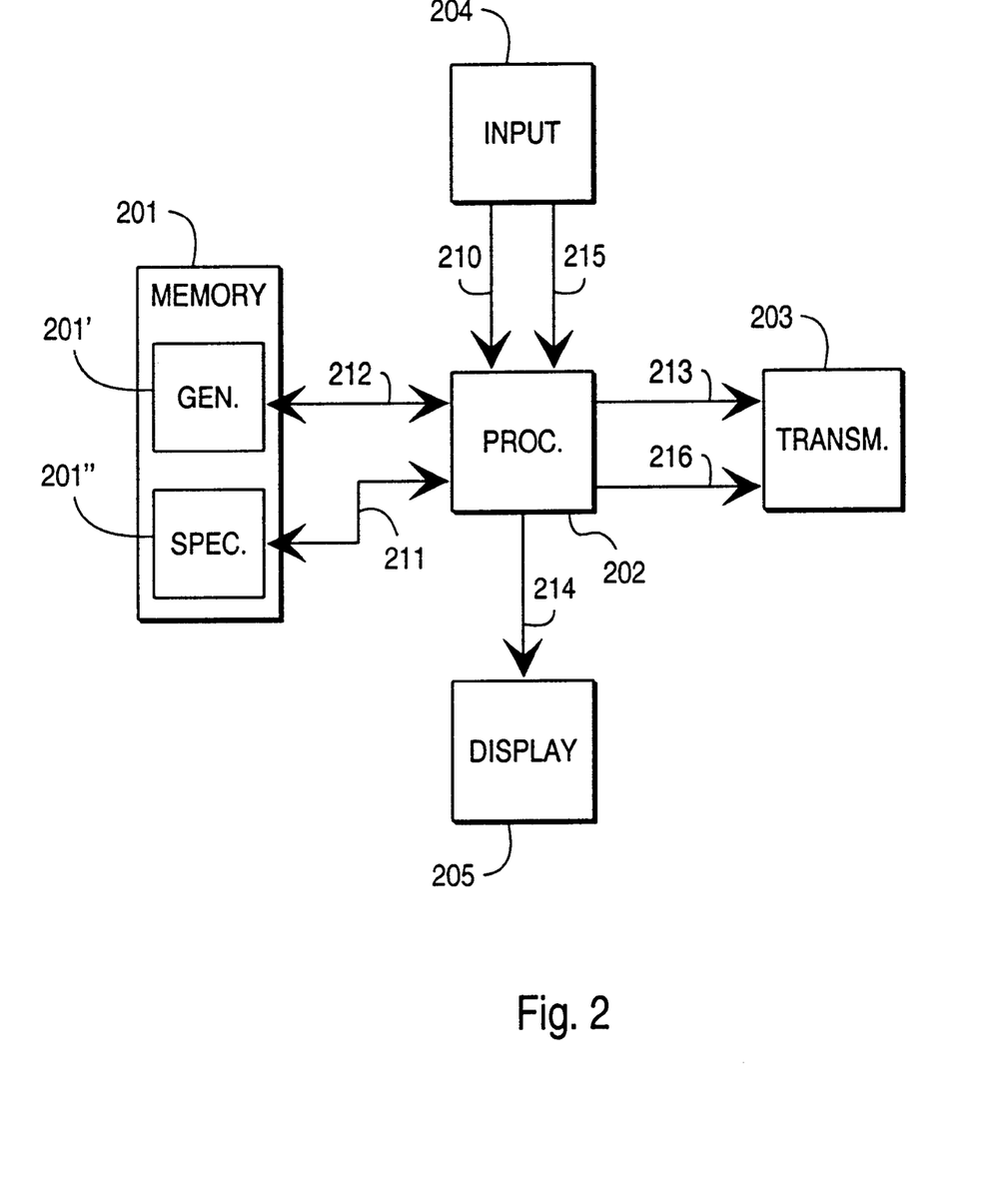
FIG. 2 illustrates a detail of the embodiment of FIG. 1.

FIG. 2 is a more detailed view of what might happen in A's telephone (or other communications terminal that A is using) during stage 101. It is typical of such devices that they contain a memory unit 201 for storing telephone numbers and related information, a processing unit 202 for processing commands given by the user as well as received and transmitted information, a transmitter unit 203 for transmitting messages composed by the processing unit as well as speech and/or data, a keyboard 204 or other input means for the user to enter commands, and a display 205 for displaying messages and other information to the user. According to an aspect of the invention the memory unit 201 contains not only previously stored telephone numbers but also information characteristic to the usual user of the device. A block 201' of the memory unit 201 may contain such "general" characteristic information that is not related to any one of the stored telephone numbers, like A's name, social security number, preferred selection of language and so on. Another block 201" of the memory unit 201 then contains the previously stored telephone numbers and all such "specific" characteristic information that is closely related to one or more of the stored telephone numbers. For example, the stored telephone number of the public library might have A's library card number stored together with it, the telephone number of the previously mentioned company B might by accompanied by A's client identification number and so on.

The operation in stage 101 starts by the user giving a command that represents his wish to place a call to a specific called party. This command usually takes the form of the user tapping in the correct telephone number through the keyboard 204 (or using some cursor keys to select the telephone number from memory 201) and pressing a "green phone" key. In voice-controlled telephone devices a voice command or a group of voice commands replaces all or nearly all key commands. Arrow 210 represents the corresponding command coming from the input means to the processing unit 202. As a response according to the invention, the processing unit composes a UUS message. There are numerous ways by which the UUS message may be composed, and the invention is not limiting in this respect. In the exemplary embodiment of FIG. 2 the processing unit 202 first checks, whether there are any "specific" information stored in association with the telephone number given by the user, which is represented by arrow 211. Thereafter the processing unit tries to fill in any gaps remaining in the UUS message by reading the corresponding information from the "general" memory block 201', as indicated by arrow 212. We may assume that a normal UUS message consists of a name, a language code and an identification code. If there was a client identification number stored together with the selected telephone number, the processing unit uses it as the identification code and reads the remaining data (name and language code) from the "general" memory block. If there was nothing in the "specific" information, the U S message will consist completely of that information read from the "general" memory block.

Thereafter the operation in FIG. 2 may continue through two alternative paths. According to an "auto UUS" mode the telephone will transmit the composed UUS message immediately after it has been completed as indicated by arrow 213. In an alternative "manual UUS mode" the processing unit directs the completed UUS message to the display 205 for displaying it to the user (arrow 214) and waits for the user to react. Arrow 215 represents the user action: either the user gives permission to send by a simple command, or the user prohibits the transmission of the UUS message by a likewise simple command, or the user edits the displayed UUS message before it will be sent. Editing a displayed character string before transmitting it is known as such to the person skilled in the art from the technology of SMS messages. If arrow 215 contains a permission to send without or after editing, the processing unit will direct the message to the transmitter unit according to arrow 216.

Possible variations to the procedure described above are for example a "fully manual UUS" mode where the processing unit does not read any information from memory before allowing the user to edit the (empty) message, a "variable field UUS" mode where the user may select beforehand which fields (name, language, ID number etc.) should appear in the UUS message in general or especially when composing a message for transmission to some specific telephone number, and a "UUS catalogue" mode where the memory contains a number of preprogrammed information elements (such as customer identification numbers) but they are not conceptually connected to any of the stored telephone numbers; the user may then compose a UUS message by selecting suitable information element(s) from the memory. In a simple variation there are no UUI elements stored in the specific memory, whereby all UUS messages follow a constant pattern stored in the general memory. In a mirror-image variation there are no UUI elements stored in the general memory, whereby the processing unit checks, whether any UUI elements are stored in the specific memory in association with the selected telephone number, and composes the UUS message to be transmitted only if it finds some.

The invention does not limit the applicability of a procedure described above in connection with FIG. 2 to the call setup phase. According to an alternative embodiment the user may activate a UUS message transmission at any time during an ongoing call. In that case the starting command represented by arrow 210 does not need to contain the telephone number to which the UUS message should be sent, because the processing unit has the number stored in some call-time register according to the usual practice in digital telephones (it is known for example to have the telephone number of the called party displayed to the user for the time while the connection remains active). All other functions may follow the description given above.

An important application of the above-explained embodiment of the invention is the addition of information to emergency calls. The called party in an emergency call is the operator at a police station, a fire station, a hospital or an emergency communications center. It is very important that the calling party is able to give as much exact information to the operator as possible. This is often difficult to accomplish, because the caller is in distress and finds it difficult to think and speak clearly. Using the above-explained UUS procedures it is possible to transmit at least some information about the caller to the called party clearly and without mistakes. In the future a mobile telecommunications device may include an integrated positioning unit like the GPS receivers known today, in which case it is possible to automatically read the current location information from the memory of the positioning unit and to include it into the UUS message transmitted at the setup, of or during an emergency call.

So far it has been expected that the information identifying the caller or "A" has been previously stored into the memory of the telephone (or other communications terminal that A is using). This is not a limiting requirement for all embodiments of the invention. From the technology of electronic recognition there are known circuits that recognise a human user by electronically reading a fingerprint from a finger pressed on a semiconductor surface or analysing a voice pattern recorded by a microphone. These circuits compare the read or recorded specimen to one or several previously stored records and indicate, whether the current specimen is similar enough to one of the previously stored records to imply a positive recognition. The processing unit may be arranged to send a UUS message only after a positive recognition and association of the recognised user to a previously stored name or other identification code in the form of a character string. In the structure schematically illustrated in FIG. 2 the required advanced input means could be conceptually included in the input means 204.

Figure 3:
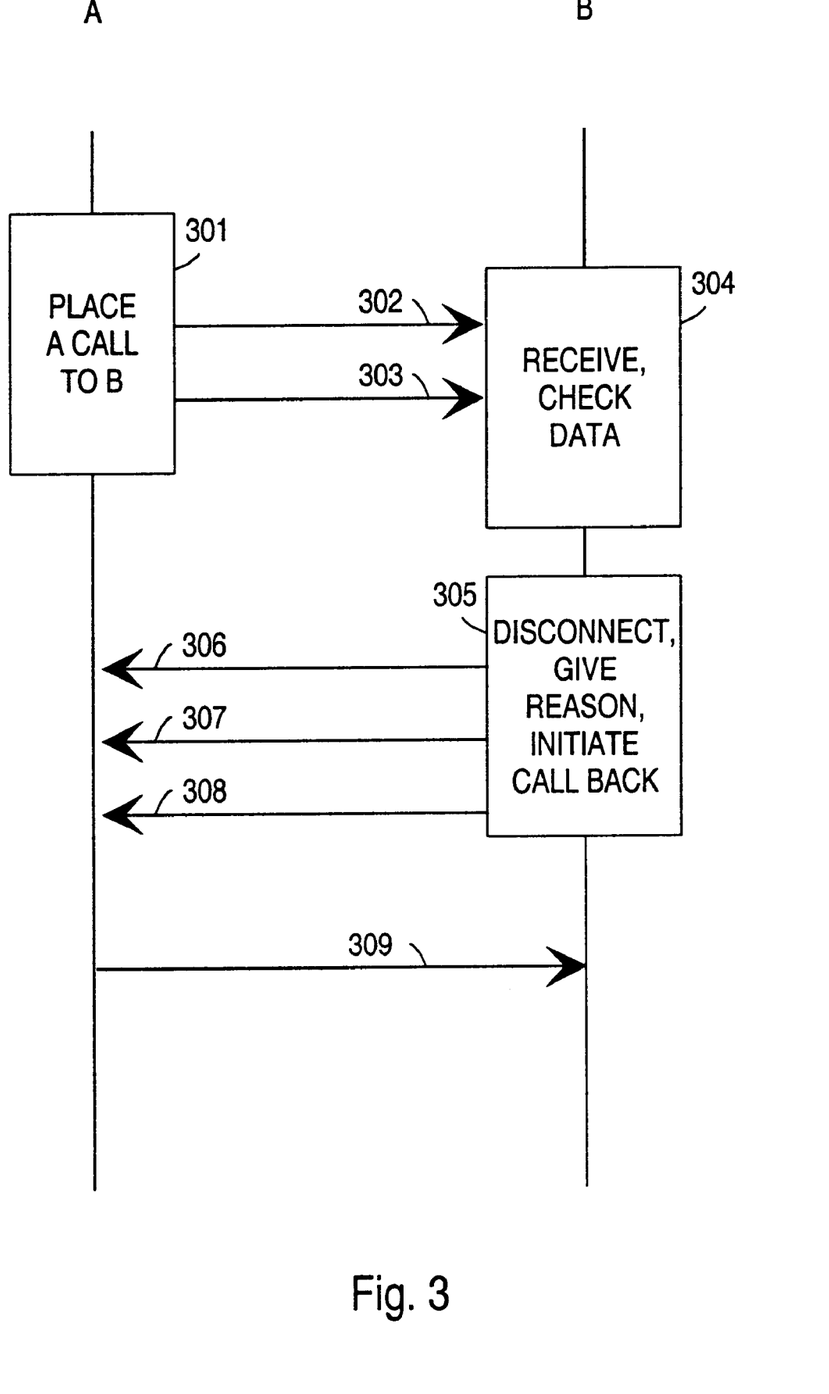
FIG. 3 illustrates another advantageous embodiment of the invention

Next we will discuss some embodiments of the present invention where the called party does not involve any human recipient. In the arrangement of FIG. 3 the caller A is a remote user wishing to employ the services of a data system B. The data system may be for example an inhouse file server of an enterprise. For smooth and correct operation it is required that an authorised but distantly located user A gets readily into contact with the data system for example for the downloading and/or uploading of files, but all unauthorised attempts to contact the data system will be promptly rejected.

At stage 301 A uses his remote terminal to place a data call to a contact telephone number of the data system B. Simultaneously or nearly simultaneously with the data call setup request 302 the remote terminal transmits a UUS message 303 containing the user ID of A. For security reasons it is appropriate that the user ID is not the same as the telephone number of A's remote terminal, although this is not a limiting feature of all embodiments of the invention. In a typical embodiment the user ID is an alphanumeric username. It may be accompanied with a secret password. Because B is a data system, the information contained within the UUS message 303 need not be in the form of an alphanumeric character string, but it may be for example a binary sequence that would be completely inconceivable to a human recipient. At stage 304 the data system B investigates the received data call setup request and the (nearly) simultaneously received UUS message. If the user ID and the possibly accompanying password are found to be correct according to a database of authorised users, the data system will allow a data transfer connection for user A. If either the user ID or the password or both are wrong, the data system refuses the requested connection.

The allowed data transfer connection could be implemented by setting up the data call that user A has requested. However, some additional advantages are gained by using a slightly more complicated embodiment of the invention, illustrated in FIG. 3. Regardless of whether the user ID and the possible password were accepted or not, the data system will send at stage 305 a call disconnect message 306 and within it or in a (nearly) simultaneous UUS message 307 a code indicating the reason for disconnecting, the latter indicating either a positive recognition or a negative recognition of the user. Immediately thereafter the data system places a so-called call back call to user A as indicated by arrow 308. In placing the call back call the data system may employ either the telephone number received in the data call setup request 302 as CLI information, or a callback number given in the UUS message 303 in addition to the user ID, or a telephone number found from the same database which the data system used to identify the user (or a similar database which the data system has access to). The latter case provides additional security against cases where an unauthorised caller might have succeeded in falsifying the user ID and/or the CLI information. Only after A has accepted the call back call according to arrow 309 the data call will become active.

The additional advantages referred to above are the added security provided by the fact that a call back call will only proceed to a terminal that the network recognises with a certain telephone number, and the possibility of getting the enterprise's all data calls from distant authorised users recorded in a single invoicing record. If this embodiment of the invention is compared to a conventional arrangement where the distant user first places a complete data call to the data system for giving his user ID over a modem connection, then this data call is terminated and the received user ID is checked by the data system, and finally a call back call is initiated from the data system to the remote user, it can be seen that at least as much time will be saved in the system of the invention as it takes to establish the first modem connection from the remote user to the data system. The reader should note that for the data system to receive and interpret the USS message 303 it is not necessary to set up a data call, although this had been formally requested by the distant user.

Figure 4:
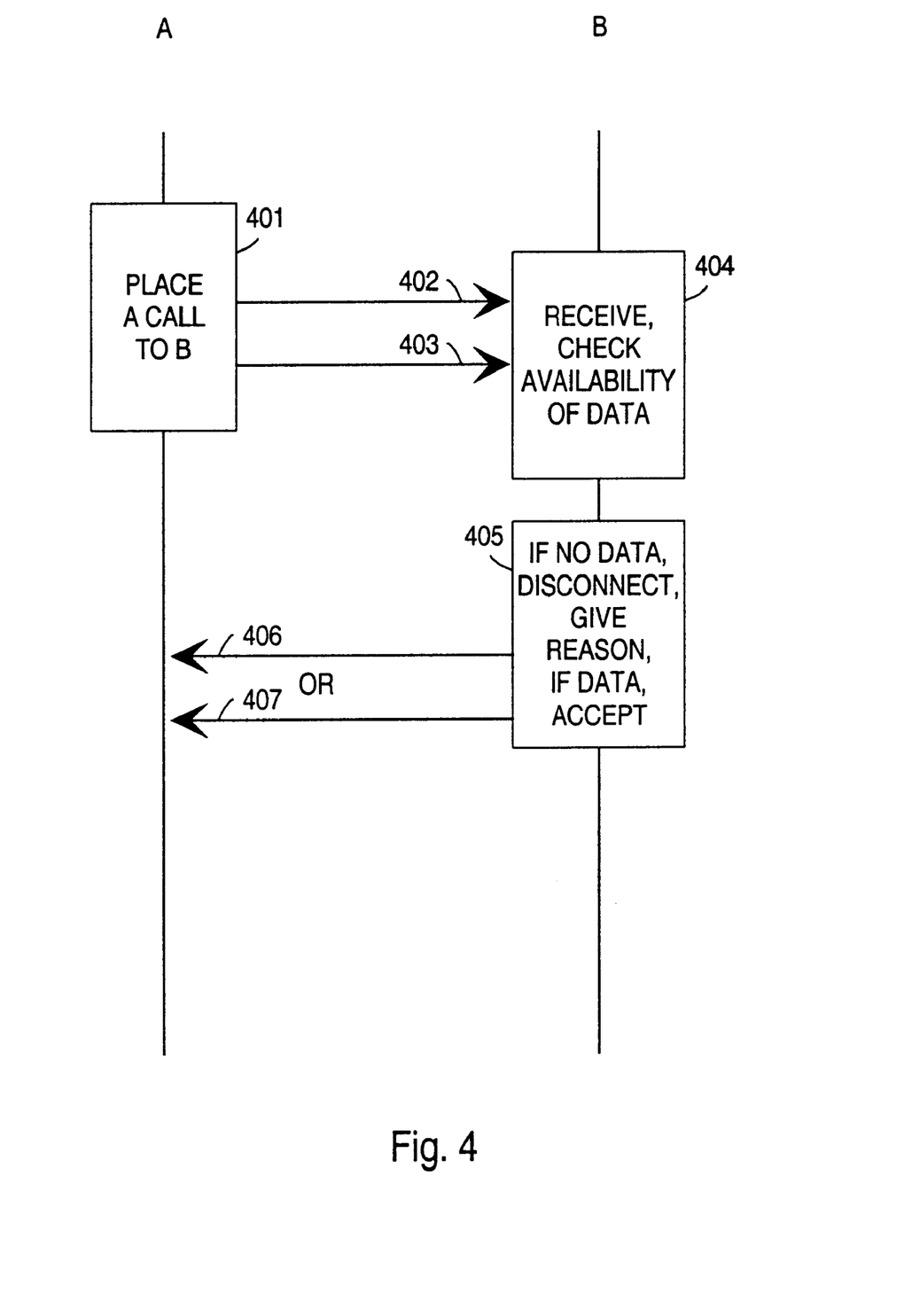
FIG. 4 illustrates a further advantageous embodiment of the invention.

Next we will discuss a second major class of embodiments of the invention, called remote polling embodiments. FIG. 4 illustrates a situation where the caller "A" is an operator responsible for the operation of one or a number of unmanned computerised remote stations "B". For the sake of example we will assume that B is an unmanned meteorological measurement station, although these embodiments of the invention are equally applicable to a wide variety of other applications. It is typical to the operation of remote computerised stations that an operator can not be sure, whether the station has any information to be transmitted at a given moment of time. In our meteorological example it may happen that at the time of collecting data, the station does not have any reasonable data available, or the situation at the station has not changed from the previous reading. Equally well the remote station may have a large number of new measurement data to be transferred to the operator.

At stage 401 A decides to poll B for the possible downloading of measurement data. A sends a data call setup request 402 and simultaneously or nearly simultaneously a UUS message 403 that contains possibly an indication of who is the caller but at least a code that identifies the call as a measurement data poll. At stage 404 B recognises the incoming call as a measurement data poll by investigating the (nearly) simultaneous UUS message. If there is no measurement data to be transmitted, setting up a data call would be just wasting telecommunication resources, so in such a case B rejects the incoming data call setup request 402 at stage 405 and transmits only a UUS message 406 containing a code indicating the reason for disconnecting (no data, no changes etc.). As an alternative, B may find at stage 404 that it has an ample supply of data to be transmitted, in which case it accepts the data call as indicated by arrow 407.

There are cases where a data call must be set up regardless of whether the remote station has data to be transmitted or not. A typical case is a maintenance situation where the operator wants to run a testing software and observe the results, or perform some other two-way communication with the remote station. In these cases either the call is identified as a "forced" data call by a specific code in the UUS message 403, or no UUS message is sent at all, which is a sign for the remote station to enter a "forced" data transfer mode.

Other similar applications for the remote polling embodiments of the invention are for example monitoring the health of a patient through a remotedly operated monitoring device (health condition normal—no data call established; abnormal conditions—set up data call for more extensive diagnosis) and monitoring the potential malfunction states of a copying machine, a computer or a corresponding piece of office or industrial equipment (normal operation or a simple error code—no data call established; abnormal conditions—set up data call for running diagnosis software or otherwise taking detailed action).

An interesting application of the remote polling embodiments of the invention is the remote controlling of simple electronically controlled processes. In a very simple process a remotedly controlled switch is either ON or OFF, or in an only little more complicated process a limited number of switches may have a limited number of states. Under normal conditions nothing else is required than changing the state of one switch from ON to OFF or vice versa, or setting a number of switches to desired positions. This may be done by formally requesting a data call and indicating the desired switch position(s) in an accompanied UUS message. The central unit of the controlled process will respond by making the desired modifications in the process, rejecting the formal request for a data call and acknowledging the whole operation by a return UUS message. If, however, some local abnormal condition prevents a switch from changing states or some other unusual detail requires operator attention, it may be necessary for the operator responsible for the remote control to establish a data call to the central unit of the controlled process. Also in these cases it is the called party (the central unit of the controlled process) that decides, whether a data call should actually be set up or not.

In all embodiments discussed above it has been implicitly assumed that the calling party makes a more or less arbitrary one-time decision about the moment of initiating the communication. This is not necessarily a limiting feature for all embodiments of the invention. The calling party may employ an automatic process that repeatedly calls some previously determined number at regular or pseudorandom intervals. This variation of the invention is especially applicable in the remote polling embodiments of the invention, where the condition of a remote station is monitored from time to time. It is assumed that in most cases the requested data call will be rejected, so the user will not have to pay for established calls. It depends on the pricing of the UUS service, whether such embodiments are commercially advantageous or not.

A more detailed embodiment of the last mentioned type is the application of the invention to a combined burglar alarm and central locking system of a house or a car. The controlled system has one switch that is either ON or OFF (doors locked or unlocked) and some kind of a finite state machine that is in one of its allowed states (alarm off, alarm armed, alarm sounding, malfunction). The user A may have an advanced mobile telephone or some other portable telecommunication device that is capable of sending and receiving UUS messages as well as placing and answering data calls. The central unit B of the controlled process has similar capabilities. By formally requesting a data call to the central unit of the controlled process and complimenting the request with a suitable (automatically) composed UUS message the user can command the locking switch and alarm activating switch to change states without actually setting up a data call. While the alarm is activated, the user's portable telecommunication device exchanges UUS messages with the central unit of the controlled process regularly or at pseudorandom intervals following the above-explained principles. Only if during a polling round an alarm situation is detected, a call will be set up to provide the user with detailed information about what is happening.

Figure 5:
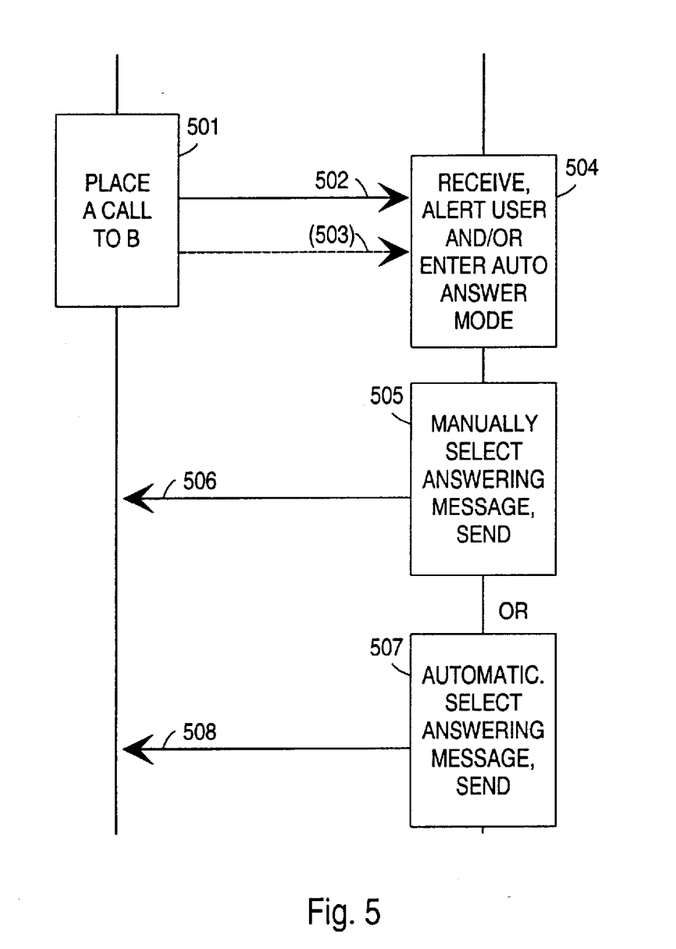
FIG. 5 illustrates a still further advantageous embodiment of the invention.

A further variation of the remote polling principle is the application of the invention to a situation where the original intention of A is actually not to poll for measurement results or other data but to establish a voice or data call as usual. The action of B causes the resulting exchange of messages to resemble the polling embodiments discussed above. As an example we will study a situation where B is in a meeting and has set his mobile telephone into silent mode, meaning that the phone announces an incoming call only by displaying a corresponding message in its display, or does not separately announce a incoming call at all. In FIG. 5, at stage 501 A tries to place a call to B. Simultaneously or nearly simultaneously with the call setup request 502 A may or may not transmit a UUS message 503. At stage 504 the mobile telephone of B receives the call setup request 502 of A and either prompts the user to react or enters an automatic UUS answer mode. We will designate these alternatives as the manual and automatic embodiments. If A has also transmitted a UUS message as illustrated by arrow 503, also the contents of this message or some information derived from the contents of this message may be displayed.

The manual embodiment means that once the mobile telephone of B has given an indication that a call is coming, it waits for the user to select a proper UUS message that should be sent to the caller as a response. In FIG. 5, stage 505 corresponds to B selecting such an answering message. It is most advantageous if there is at least one previously stored answering message which B may choose to be sent with a single key command. If there are several previously stored answering messages to choose from, they may be represented in a display or like by different selectors, e.g. graphical symbols or alphanumeric headers. In selecting the message B may take into consideration the identity of A, if it was received as CLI information or within an optional UUS message 503. One possible answering message could be "Hold on, I'll answer in a minute" with which B may inform A that it will take some time before he has left the meeting room to talk freely, and that A should not hang up before that. Naturally the invention sets no limits to the contents of the messages as long as they fill the formal requirements of UUS. Arrow 506 illustrates the answering message selected by B and sent to A. One of the manually selectable alternatives could be answering the call right away and not sending a UUS message at all, in case it is a business call that may have important consequences to the meeting.

The automatic embodiment means that B has previously programmed his mobile telephone to select and send a UUS message in response to an incoming call. There may be a single answering message that the phone uses to answer all incoming calls, or an answering message may be selected according to some caller recognition rules. In the latter case any known recognition strategy is applicable, like different answering messages for business or private callers, different answering messages for in-house colleagues or clients and so on. Some examplary answering messages could be "Cannot answer right now, will call you back", "I'm in a meeting right now" or "I'm on vacation, please call my secretary". In FIG. 5, stage 507 represents the automatic selection of an answering message and arrow 508 illustrates the transmission of the selected message. The automatically selected answering message may be even personal, whereby the mobile telephone of B reads it from a memory where a personal message accompanies at least one previously stored identification of a person that could be called or that could call, or it may contain personal parts which are read from such a memory ("Hello Harry, I'm in a meeting right now").

The automatic embodiment is advantageously combined with the concept of operation modes known from the Nokia 6110 mobile telephone. The user may set his mobile telephone to a certain mode, which means that a predetermined group of functional selections are made with one command. According to the invention, a certain answering message may be one of the features associated with at least one of the modes.

Finally, for reducing the invention into practice, we will consider some known aspects of UUS and their implications to the invention, as well as a suggested enhancement to the existing UUS. There are three subclasses of UUS, namely Service 1, Service 2 and Service 3. A user has access to these services as described in his/her subscription contract with the system operator. According to Service 1, UUI can be sent and received during call setup and termination by embedding UUI into the appropriate call control messages. Service 1 can be an implicit part of each call setup, whereby the user does not have to initiate the transmission of a UUS message separately, or it may be explicit in which case the user has to initiate an appropriate procedure. Service 2 encompasses the UUS messages that are sent and received after the calling party has received an indication that the called party has been informed of the call, but before the call is actually established. The network is not responsible for delivering a sent Service 2 message to its recipient before the call will be established. All UUS messages referred to above in the description of the invention as being transmitted simultaneously or nearly simultaneously with a (data) call setup request may belong to Service 1 or Service 2, but it is preferable to use Service 1 because gaining advantage from the features of the invention usually requires that the recipient receives such a UUS message before the call setup is completed. Even if the UUS messages have been described above as separate messages (separate arrows in the Figs.) it is readily understood that such description is meant only to clarify the role of UUS when used according to the invention, and the respective UUI may be embedded in other messages. All such UUS messages that are sent and received during an established call connection belong to Service 3.

The length of the UUS messages is not limited by the invention. However, some practical considerations set a limit to the maximum usable length. For example an ISDN system (Integrated Services Digital Network) allows as a network option the transfer of UUI with a maximum length of 32 octets for Service 1. An octet of bits is usually required to represent a character in a character string, so the corresponding maximum length in characters would be 32 characters.

Figure 6:
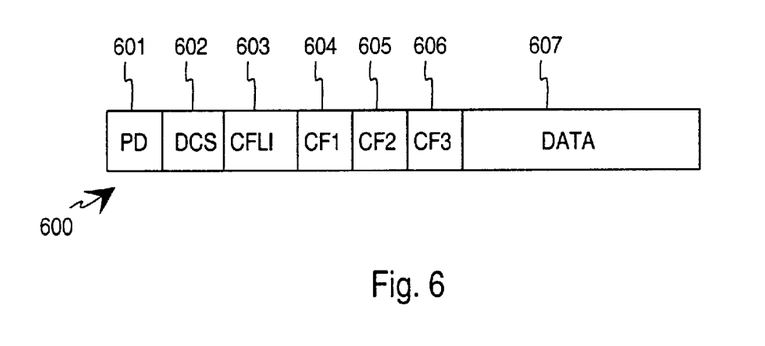
FIG. 6 illustrates a suggested data structure to be used in connection with the invention.

According to the invention, the UUS messages may be used to convey information also in other forms than character strings. The existing UUS standards do not specify any detailed structure for the UUS messages. FIG. 6 illustrates one possible structure that could be advantageously used in a scheme where the contents of the UUS message may be in various forms (characters, binary data etc.) and destined to various units (display, SIM, control block etc.) in the receiving device. The examplary UUS message 600 contains a Protocol Discriminator (PD) field 601, a Data Coding Scheme (DCS) field 602, an Control Field Length Indicator (CFLI) field 603, three Control Fields (CF) 604, 605 and 606 as well as a data field 607. Of these, the PD and DCS fields together indicate, what kind of coding and what kind of protocol have been used in the preparation of the message, the CFLI field indicates the combined length of the header fields (all fields except the data field) and the CF fields may be used to transmit the identification of the functional block in the receiving device to which the UUS message is destined, the specific intended action that the receiving device is supposed to do and to which the contents of the UUS message are related, or some other information like sequence numbering of several consecutive messages.

The endpoints of a point-to-point connection where UUS is used according to the invention may be mobile-to-mobile, mobile-to-PLMN (Public Land Mobile Network), mobile-to-ISDN network, mobile-to-ISDN terminal, or mobile-to-PSTN (Public Switched Telephone Network). If the other end is PLMN, ISDN network or ISDN terminal, it must be equipped with sufficient ISUP (ISDN Signalling User Part) signaling support known as such to the person skilled in the art. If the other end is PSTN, it must be equipped with sufficient inter-exchange ISUP signaling support known as such to the person skilled in the art.

If the UUS message must travel from one kind of network to some other kind of network (like from PLMN to PSTN or vice versa), suitable interworking functions are required between the networks to ensure the correct trasmission of the UUS. Especially the interworking unit realising such functions must be able to notice the presence of UUI and locate the UUI in the message(s) arranged according to the protocols applied in the first network, and copy the UUI to a suitable location in the message(s) arranged according to the protocols applied in the second network. The interworking unit is most preferably a part of the gateway switch connecting the two networks together.

The invention has been described solely with reference to the UUS as described in the standards of ETSI. However, it is clear that it is also possible to apply the invention to systems known with different names, if the signalling characteristics of such systems otherwise make it possible to transmit short character strings from one communications device to another communications device transparently through a telecommunications network in close association with a proceeding or ongoing call.

What is claimed is:

1. A method for complementing a telephone connection with additional information, comprising the steps of:
   transmitting from a first telecommunication device to a second telecommunication device a request for setting up a telephone connection,
   transmitting, from said first telecommunication device to the second telecommunication device a certain first signalling message associated to the call the setting up of which was requested by said request, and making a decision about how to handle the call the setting up of which was requested by said request, on the basis of the information received in said first signalling message, wherein the step of making a decision about how to handle the call comprises the substep of directing the request from the second telecommunication device further on the basis of the information received in said first signalling message.

2. A method according to claim 1, wherein said second telecommunication device is a Private Automated Branch Exchange, whereby the step of making a decision about how to handle the call comprises the substep of directing to the request to a certain extension selected on the basis of the information received in said frist signalling message.

3. A method according to claim 2, wherein the step of making a decision about how to handle the call additionally comprises the substep of retrieving previously stored data from a database on the basis of the information received in said first signalling message.

4. A method according to claim 1, wherein the step of transmitting a certain first signalling message comprises the substep of reading previously stored data from a memory and inserting the read data as a part of said first signalling message.

5. A method according to claim 4, wherein the step of transmitting a certain first signalling message additionally comprises the substep of selecting the previously stored data to be read from the memory on the basis of the telephone number to which the request for setting up a telephone connection will be transmitted.

6. A method according to claim 4, wherein the step of transmitting a certain first signalling message additionally comprises the substep of selecting the previously stored data to be read from the memory regardless of the telephone number to which the request for setting up a telephone connection will be transmitted.

7. A method according to claim 4, wherein the step of transmitting a certain first signalling message additionally comprises the substep of selecting a first piece of previously stored data to be read from the memory on the basis of the telephone number to which the request for setting up a telephone connection will be transmitted and a second piece of previously stored data to be read from the memory regardless of the telephone number to which the request for setting up a telephone connection will be transmitted.

8. A method according to claim 4, wherein the step of transmitting a certain first signalling message additionally comprises the substep of selecting the previously stored data to be read from the memory as a response to a user-given command indicating the selection of a certain piece of data from a previously stored list of mutually alternative pieces of data.

9. A method according to claim 1, wherein the step of transmitting a certain first signalling message comprises the substeps of:

prompting a user to enter the characters to be included in the first signalling message, and composing the first signalling message from characters entered by a user.

* * * * *